United States Patent [19]

Skover, Jr. et al.

[11] Patent Number: 4,469,010
[45] Date of Patent: Sep. 4, 1984

[54] MOTION DAMPENING SEAT SUSPENSION SYSTEM

[75] Inventors: Nick Skover, Jr., Dousman; Garry J. Sabel, Milwaukee, both of Wis.

[73] Assignee: Applied Power Inc., Milwaukee, Wis.

[21] Appl. No.: 353,142

[22] Filed: Mar. 1, 1982

[51] Int. Cl.³ .............................................. F15B 15/22
[52] U.S. Cl. ........................................... 91/408; 91/24;
91/396; 91/402; 91/405; 92/12; 92/134;
248/566; 267/131; 267/136; 188/299; 188/311;
188/314; 188/322.14
[58] Field of Search .................... 60/413; 91/404, 405,
91/407, 24, 408, 409, 402, 357, 396; 172/435,
431; 248/566; 297/347; 267/131, 136, 126;
92/108, 134, 81, 12; 188/314, 299, 311, 322.14

[56] References Cited

U.S. PATENT DOCUMENTS

| 853,421 | 5/1907 | Ritter | 91/396 |
| 2,794,425 | 6/1957 | Tyler | 92/81 |
| 3,436,048 | 4/1969 | Greer | 297/347 |
| 4,222,555 | 9/1980 | Eimen | 267/126 |

Primary Examiner—Robert E. Garrett
Assistant Examiner—Scott L. Moritz
Attorney, Agent, or Firm—Fred Wiviott

[57] ABSTRACT

A system for resiliently supporting a load at a reference height includes a hydraulic cylinder for resiliently supporting a load about a reference height and an accumulator which cooperates with the cylinder for flowing hydraulic fluid therebetween in response to varying loads imposed on the cylinder. A valve is provided for dampening the rate of fluid flowing between the cylinder and the accumulator and a metering valve coacts with the cylinder for adjusting the reference height about which the load is supported.

18 Claims, 9 Drawing Figures

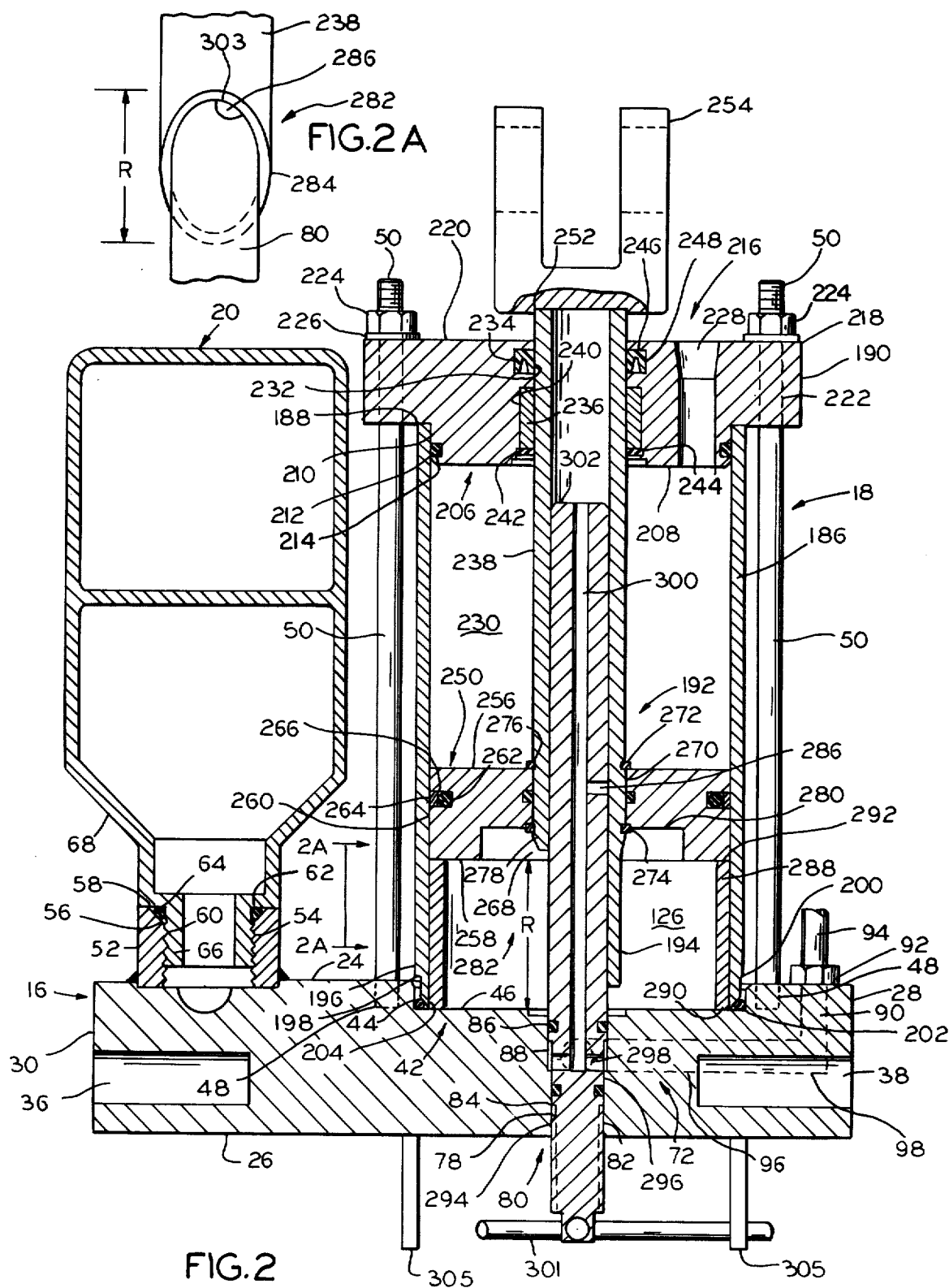

MOTION DAMPENING SEAT SUSPENSION SYSTEM

BACKGROUND OF THE INVENTION

This invention relates generally to a seat suspension apparatus for resiliently supporting the operator's seat on off-highway vehicles such as tractors and the like. More particularly, the invention comprises an improved hydraulic system having a hydraulic cylinder for supporting the seat, fluid receiving means for providing cushioned, impact-attenuating seat support and means for adjustably dampening fluid flow rates between the cylinder and the fluid receiving means. An adjustable metering valve is provided within the cylinder for automatically positioning the seat to a preselected reference height which is independent of the weight of the operator.

Such vehicles are usually operated upon rough terrain and unless minimized, the resulting impact to the seated operator impairs vehicle control and increases operator fatigue. The controllability of the vehicle is enhanced and operator fatigue is further reduced if the height of the seat is adjustable to conform to the physical characteristics of a particular operator. Prior art devices for resiliently supporting seats at an adjustable height and for attenuating the severity of such impact include motion dampening resilient springs of the leaf, coiled or air variety and are sometimes used in conjunction with conventional automotive shock absorbers. Adjustment of seat height is usually accomplished by providing means for manipulating the entire platform upon which the seat support system is mounted. When such springs are selected to have a low spring rate and provide optimum impact dampening upon downward seat movement, the resulting time required to return the seat to a reference height is undesirably increased. Conversely, if springs having a high rate are selected for optimum time of return to a reference height, the impact dampening characteristics upon downward seat movement become unnecessarily harsh. While these prior art devices have heretofore provided satisfactory means for supporting and cushioning seats on off-highway vehicles, the resulting motion dampening characteristics are undesirably uniform for either direction of seat movement relative to the supporting vehicle. Additionally, their mechanisms for adjusting seat height are often comprised of multiple part mechanical linkages which are cumbersome and difficult to operate. Accordingly, a system which provides resilient, cushioned seat support at an easily adjustable height independent of operator weight and which provides for adjustable motion dampening characteristics which are optimized for either direction of seat movement would be a significant advance over the prior art.

SUMMARY OF THE INVENTION

In general, the motion dampening seat suspension system of the present invention includes first means and second means cooperating for flowing hydraulic fluid therebetween in response to varying loads imposed upon the first means. Means are provided for controllably dampening the rate of fluid flowing between the first means and the second means and a metering means is provided to coact with the first means for automatically supporting a seat at a reference height.

In a preferred embodiment, the first means and second means includes a hydraulic cylinder and an accumulator respectively, the cylinder being attached to a lower base block and having an upwardly extending, cylindrical sidewall which is closed at its upper end by a plug member. A movable piston assembly having a lower, disc-shaped head and an upwardly extending, elongate, tube member is telescopingly received within the cylinder body so that the periphery of the head closely, slidably engages the interior surface of the wall and the tube member extends upwardly through an aperture in the plug member for attachment to the supported seat. The means for determining the reference height about which the seat is supported includes the lower end of the tube member which protrudes below the head and is formed by a planar cut angularly displaced from the longitudinal tube member center line. When viewed in elevation the lower end defines an oval shaped edge for providing fluid metering engagement with a valve member. An elongate, rod-like valve member has a coaxial, longitudinal passage which is connected to an external tank by an appropriate tank duct in the block and an intersecting radial cross passage positioned intermediate the upper and lower ends of the valve member. The member is threadably received in and supported by the block, extends upwardly therefrom and is closely, slidably received within the tube member for providing valving engagement therewith. The vertical location of the radial passage with respect to the movable piston assembly is selected so that the passage may intersect points along the oval shaped edge for a range of positions of the piston assembly within the cylinder sidewall. The valve member is manually rotatable within the block for providing position adjustment of the cross passage over an arc of approximately 120°. The intersection of the oval shaped edge and the cross passage thereby provides an orifice means for metering fluid between the cylinder and tank, for controlling the fluid pressure within the cylinder to counterbalance the combined weight of the seat and the operator. The vertical location of the orifice means and therefore of the supported seat attached to the tube member will be at a distance above the lower block which is adjustably variable within a range depending upon the position of the valve cross passage within the defined 120° arc and the seat is thereby automatically supported about a selected reference height.

The means for controllably dampening the rates of fluid flow between the support means and a fluid receiving means includes an adjustable, spring biased check valve disposed in a duct connected between the cylinder interior and a fluid receiving means such as a hydraulic accumulator. The check valve has, in its first open position, an enlarged first flow area in a first flow direction from the cylinder to the accumulator and, in its second closed position, a restricted second flow area in a second flow direction from the accumulator to the cylinder. The check valve is configured so that the flow areas may be adjusted over a range while maintaining the first area and the second area at an optimized, predetermined area ratio which in a preferred embodiment, is about 3:1. In this manner, the check valve provides means by which fluid expelled from the cylinder chamber by a sudden downward seat movement may flow to the accumulator at a lightly dampened rate for rapid impact absorption and yet provide a moderately dampened rate of fluid flow from the accumulator to the chamber for more slowly returning the seat upwardly to its selected reference height. Optionally, an adjustable flow control valve may be used in place of the check valve for providing a flow dampening area which is the same for either direction of fluid flow between the cylinder and the accumulator. Trunnion holes are formed at either end of the block for pivotably coupling the block to the vehicle chassis and a clevis is affixed to the upper end of the rod member for pivotably coupling the cylinder between the vehicle and the underside of the seat.

Fluid under pressure is introduced to the chamber through an appropriate pressure duct and with the operator seated in a steady-state condition, the oval shaped edge of the tube member will intersect the valve member radial cross passage and define an orifice to partially restrict the flow of pressurized fluid from the chamber to the external tank. The resulting degree of restriction will be that which is necessary to provide a chamber pressure and resulting upward force to counterbalance the combined weight of the seat and the operator. The reference height of the seat may be selected by the operator within a predetermined range by manually rotating the valve member through the described arc. Upon an abrupt upward movment of the vehicle chassis to telescopingly retract the piston assembly and seat, the oval edge overlaps and closes the radial passage to prevent the escape of pressurized fluid from the cylinder to the tank. Fluid is thereupon rapidly expelled from the cylinder through the first area of the open check valve and into the hydraulic accumulator for rapidly responsive, cushioned impact dampening. The resulting elevated pressure within the accumulator causes the fluid received therein to be returned through the second area of the closed check valve to the cylinder chamber for returning the seat to its reference height. Alternately, if the vehicle chassis moves abruptly downward to extend the piston assembly, the oval edge controllably opens the radial passage, permitting fluid to be expelled from the cylinder to the tank, thereby reducing cylinder pressure and permitting the piston assembly to retract to its reference height under the weight of the operator. The operator may adjust the setting of the check valve to select the most desirable motion dampening characteristics. In the likely event of constantly undulating terrain, it will be difficult and, in fact, undesirable from the standpoint of operator comfort to precisely maintain the seat at a reference height. However, the inventive system will function to maintain the seat about a reference height consistent with the desired degree of impact cushioning.

It is an object of the invention to provide a new and improved motion dampening system for vehicle seats.

Another object of the invention is to provide a seat suspension system which may be adaptably mounted to a variety of off-highway vehicles.

Yet another object of the invention is to provide a cushioning suspension system for supporting a vehicle seat about a selectively adjustable reference height which is independent of seat loads.

Still another object of the invention is to provide a seat suspension system wherein the rate of impact absorption and the rate of return of the seat to a reference height may be maintained in a predetermined ratio.

Another object of the invention is to provide a seat suspension system having means for adjusting the rates of impact absorption and seat return and yet maintaining these rates in a predetermined ratio.

Another object of the invention is to provide a vehicle seat suspension system which may be adapted for use with the vehicle hydraulic system. These and other objects of the invention will become more apparent from the detailed description thereof taken with the accompanying drawing.

DESCRIPTION OF THE DRAWING

FIG. 2 is a sectional front elevation view of the seat suspension system taken along the line 2—2 of FIG. 1A;

FIG. 2A is a side elevation view of the lower terminus of a tube member of the seat suspension cylinder as viewed along line 2A—2A of FIG. 2;

DESCRIPTION OF A PREFERRED EMBODIMENT

Figure 1:
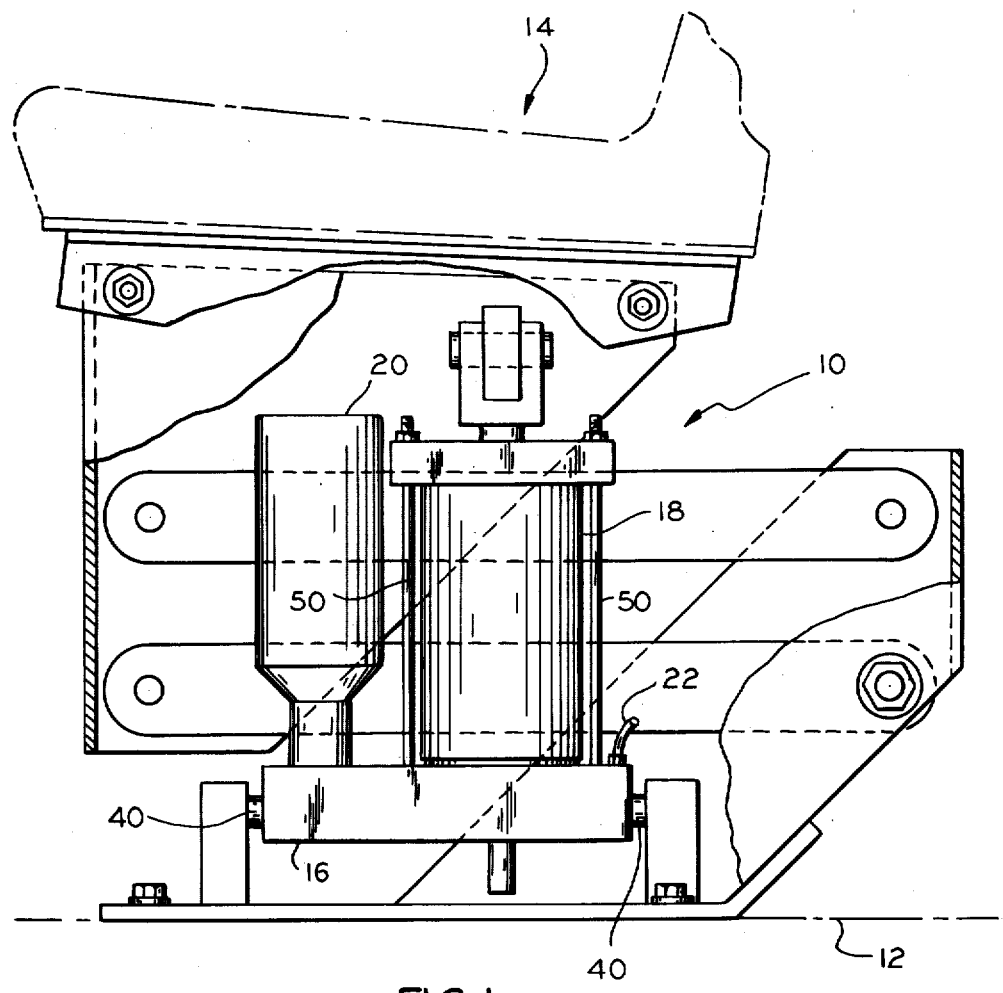
FIG. 1 is an elevation view of the seat suspension system of the present invention shown in conjunction with a seat installation.

In FIG. 1, the seat suspension system 10 of the present invention is illustrated in connection with a off-highway vehicle such as a crawler tractor having a rigid chassis 12 and an operator's seat 14. The system is coupled to between the seat and the chassis and is shown to include a lower support block 16 for providing fluid porting and flow ducts and for supporting a hydraulic cylinder 18 and a hydraulic accumulator 20 in a horizontally spaced-apart relationship. An adjustable spring biased check valve assembly is disposed in a duct formed in the block between a cylinder chamber and the accumulator 20 for controllably dampening the flow rates of fluid passing therebetween. Fluid connections to the system pump and tank are by rigid or flexible fluid conductors 22 selected in a known manner in accordance with system pressure and flow parameters.

Referring to FIGS. 1, 2, 3, and 4, the generally rectangular, horizontally disposed lower block 16 is defined by an upper surface 24, a lower surface 26, a right end 28, a left end 30 longitudinally spaced-apart therefrom and laterally spaced-apart front and rear sides 32 and 34 respectively. Cylindrical trunnion holes 36 and 38 are formed to a depth in the left end 30 and the right end 28 respectively for pivotably receiving trunnion pins 40 coupling the block 16 to the chassis 12. The longitudinal axes of the holes 36 and 38 are generally parallel to the surfaces 24, 26 and are spaced midway between the sides 32 and 34. A shallow pocket 42 having a vertical, cylindrically shaped side 44 and a planar horizontal bottom face 46 is formed in the upper surface 24 adjacent the right end 28 for receiving and supporting the wall of a hydraulic cylinder 18. A plurality of threaded tie bolt holes 48 are formed to a depth in the upper surface 24 and located at regular intervals about the circumference of the pocket 42 in spaced-apart relation therefrom for attaching the cylinder 18 to the block. In a preferred embodiment, four tie bolts 50 are used and are received in holes 48. A cylindrical port boss 52 having a vertically disposed, threaded bore 54 coaxially formed therein is attached to the upper surface 24 of the block 16 adjacent the left end 30 for threaded attachment of the fluid receiving accumulator 20. The boss 52 includes a chamfer 56 formed intermediate its upper face 58 and the upper end 60 of the bore 54 for sealing engagement with a resilient O-ring 62 confined in a suitable ring groove 64 formed intermediate the accumulator threaded neck 66 and the accumulator body 68. The accumulator 20 is preferably of the gas-filled, bladder type and has a precharge pressure which is selected in a known manner. This pressure is a function of the anticipated range of loads to be imposed upon the system by the combined weights of the seat 14 and the operator and of the desired system equivalent spring rate of "stiffness." In general, higher imposed weights and/or a higher spring rate will require increased precharge pressures and the nominal range of precharge pressure is 50 psi to 100 psi with 80 psi being preferred. In order to permit connection of the system to the externally mounted vehicle hydraulic tank and pump (not shown) and to permit the flow of fluid between the cylinder 18 and the accumulator 20 through the adjustable check valve assembly 70, the block 16 includes a tank duct 72, a pressure duct 74 and an accumulator duct 76. A generally cylindrical, vertical through bore 78 is formed coaxially to the pocket face 46 for receiving and supporting a valve member 80 and has a threaded lower portion 82 for attachment of the valve member 80 and intermediate and upper portions 84 and 86 respectively. The portions 82, 84, and 86 are of progressively increasing diameters for permitting rotatable, sealing engagement of the valve member 80 with the portions 84 and 86 and for providing a small tank cavity 88 in fluid communication with the tank duct 72.

Figure 3:
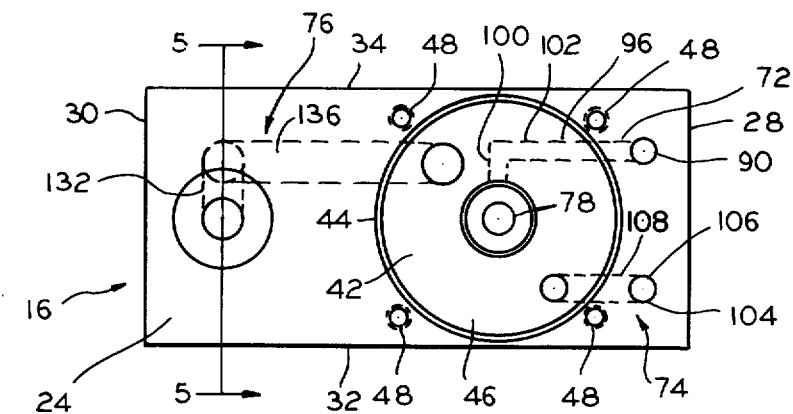
FIG. 3 is a top plan view of the lower support block of the seat suspension system with portions shown in phantom.

Referring now to FIGS. 2 and 3, the tank duct 72 provides fluid communication between the cavity 88 and an externally mounted hydraulic tank (not shown) and includes a vertical first passage 90 formed to a depth in the upper surface 24 and located adjacent the corner defined by the rear side 34 and the right end 28. At its upper end, the passage 90 has a threaded port 92 adapted to receive a fluid conductor 94 for connecting the duct 72 to the hydraulic tank. A second horizontal passage 96 is formed intermediate the upper surface 24 and the lower surface 26 to be generally parallel to the sides 32 and 34 and has a first end 98 connected to the vertical passage 90. A third horizontal passage 100 is formed intermediate the upper surface 24 and the lower surface 26 to be generally parallel to the ends 28 and 30 for connecting the tank cavity 88 to the second end 102 of the passage 96.

Figure 4:
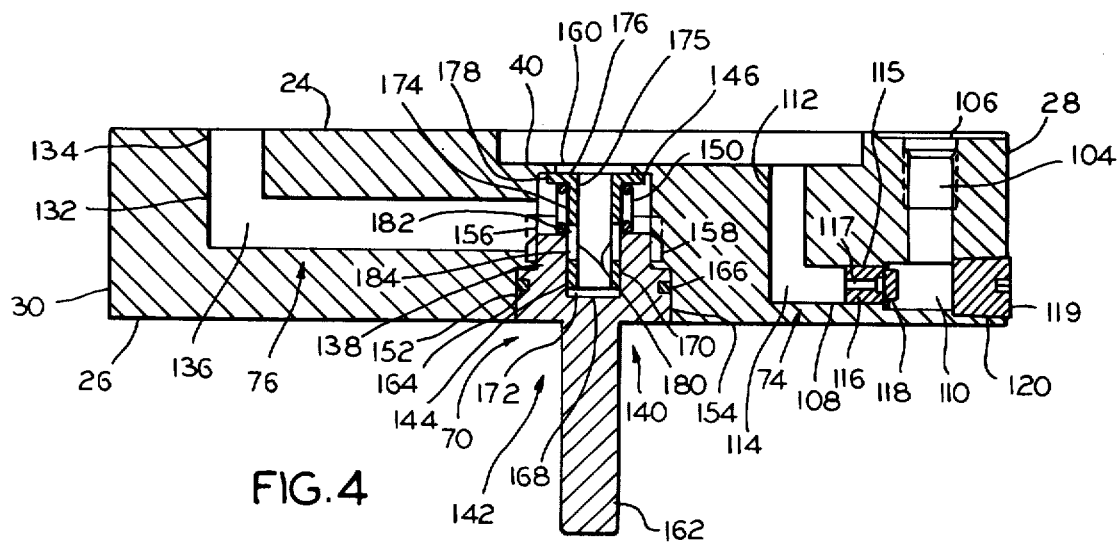
FIG. 4 is a sectional front elevation view of a first embodiment of the seat suspension system taken along the line 4—4 of FIG. 1A.

As shown in FIGS. 2, 3 and 4 the pressure duct 74 has a generally cylindrical, first channel 104 formed to a depth in the upper surface 24 and located adjacent the corner defined by the front side 32 and the right end 28 in spaced-apart relationship from the duct 72 as seen in FIG. 3. The channel 104 includes a threaded upper portion forming a pressure port 106 and adapted to receive a fluid conductor for connecting the duct 74 to a hydraulic pump. The pressure duct 74 also includes a horizontal second channel 108 formed intermediate the upper surface 24 and the lower surface 26 to be generally parallel to the sides 32 and 34 and has a first end 110 connected the first channel 104. Connection of the interior chamber 126 of the cylinder 18 to the pump via the second channel 108 is by a vertical third channel 112 formed in the pocket face 40 at a location intermediate the side 44 and the bore 78 and at a depth sufficient to intersect with the second end 114 of the channel 108.

The second channel 108 includes an intermediate threaded throat 115 adapted to receive a plug 116 having a longitudinal orifice 117 formed therethrough for controlling the maximum flow rate at which fluid may be introduced into the cylinder 18 from the pump. A small filter screen 118 is pressed into channel 108 between the plug 116 and a service plug 119 threadably received in a hole 120 formed in side 28 and coaxial to the second channel 108. The service plug 119 may be removed for replacement of the screen 118 and cleaning of the orifice 117, if required.

Figure 5:
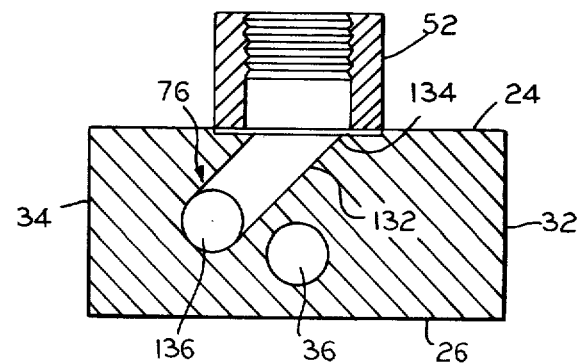
FIG. 5 is an end elevation view of the lower support block taken along the line 5—5 of FIG. 3.

As shown in FIGS. 3, 4 and 5, the accumulator duct 76 includes a first leg 132 having its upper terminus 134 coaxial with and connected to the port boss 52. In order to provide sufficient wall thickness between the leg 132 and the trunnion hole 36 to contain fluid under pressure and to facilitate connection of the accumulator 20 to the cylinder 18, the leg 132 is formed angularly downwardly, rearwardly along an axis generally parallel to the left end 30 to a depth to intersect a horizontal second leg 136. The second leg 136 is disposed intermediate the surfaces 24 and 26 in spaced-apart relationship from the hole 36, is arranged generally parallel to sides 32 and 34, and connects the lower end of the first leg 132 to a cylindrical-shaped check valve bore 138 extending between the pocket face 40 and the lower surface 26. The location of the bore 138 is selected to communicate with the cylinder chamber 126 and to provide tangential intersection of the second leg 136 with the bore periphery.

An adjustable, flow restricting check valve assembly 140 is received in the stepped bore 138 and includes a threaded plug 142 for adjusting the valve setting. A movable check member 144 is slidably received within the threaded plug 142 and retained by a lip 146 formed at the upper end of bore 138 for providing an enlarged first flow area and a smaller, second flow area as described in detail below for controllably dampening the flow rates of fluid passing between the cylinder 18 and the accumulator 20. A resilient spring 150 is disposed intermediate the check member 144 and the plug 142 for urging the check member 144 to an abutting relationship with the lip 146.

More particularly, the bore 138 includes an enlarged cylindrical lower portion 152 adapted to receive the shoulder 154 of the plug 142 in rotatable, closely fitted sealing engagement therewith and an intermediate portion 156 of reduced diameter which has a threaded lower section for receiving the upper plug end 158. At its upper terminus, the bore 138 also includes an inwardly projecting, circumferential lip 146 for retaining the check member 144, the inward edge of the lip defining a circular aperture 160 having a passage area through which fluid may flow between the cylinder chamber 126 and the check valve assembly 140.

The plug 142 includes a rod-like, downwardly projecting lower end 162 for permitting rotatable adjustment of the check valve 140 and a threaded, upper end 158 for engaging portion 156 of the bore 138. A cylindrical shoulder member 154 of enlarged diameter is formed intermediate the lower end 162 and the upper end 158 and is sized for closely-fitted, rotatable engagement with the lower portion 152. Fluid-tight, sealing between the shoulder 154 and the lower portion 152 is by a resilient O-ring 164 disposed in a groove 166 circumferentially-formed in the shoulder periphery. A coaxial, vertical hole 168 having a cylindrical sidewall 170 and a horizontal, planar bottom 172 is formed to a depth in the upper end of the plug 142 for receiving and supporting the check member 144 in loosely-fitted, slidable engagement.

The check member 144 includes an elongate, hollow, cylindrical side wall 174 terminating at the wall upper end 175 in an outwardly projecting annular flange 176. The outer diameter of the flange 176 is selected to be somewhat greater than the diameter of the aperture 160 defined by the lip 146 and yet less than the diameter of the intermediate portion 156 so that the lip 146 overlappingly engages the flange 176 to confine the check member 144 while permitting free movement thereof intermediate the lip 146 and the bottom 172. As seen in FIG. 4, the distance between the undersurface of the lip 146 and the bottom 172 is selected to be somewhat less than the overall height of the check member 144 when the plug 142 is adjusted to its illustrated upwardmost position. When constructed and arranged in this manner and when the check member 144 abuts the bottom 172, the flange 176 will be spaced downwardly from the lip 146 to define an annular, first flow area 178 between the lip 146 and the flange 176 for controllably flowing fluid from the chamber 126 to the accumulator 20 in a first direction. A resilient spring member 150 is disposed intermediate the flange 176 and the upper end 158 of the plug member 142 for urging the flange 176 to an abutting relationship with the lip 146 when fluid is passing from the accumulator 20 to the cylinder chamber 126 in a second direction. The member 150 is preferably a coil spring having a rate sufficiently low so that fluid passing from the cylinder chamber 126 to the accumulator 20 in a first direction will depress the check member 144 against the urging of the spring 150, pass through the passage area 160 and first flow area 178 defined by the resulting annular space between the lip 146 and the flange 176 and flow thence to the accumulator 20. When fluid flows in a second direction from the accumulator 20 to the cylinder chamber 126 as described below, the check member 144 moves upwardly so that its flange 176 abuts the lip 146 and closes the first flow area 178 as shown.

A pair of flow restricting, laterally opposed apertures 180 are formed in the check member wall 174 intermediate the upper end 175 and lower end 182 of the sidewall 174. The vertical location of the apertures 180 is selected so that when the flange 176 abuts the lip 146, the upper edge of the hole 168 intersects the apertures 180 along an arc thereof to divide the apertures 180 into upper, exposed segments 182 and lower segments 184 which interface with and are covered by the interior surface of the hole 168 for any adjusted position of the plug 162. The combined areas of the exposed segments 182 provide a second flow area for dampening the flow rate of fluid passing from the accumulator 20 to the cylinder chamber 126 in a second direction when the first flow area is closed by abutment of the flange 176 with the lip 146. A feature of a preferred embodiment of the inventive system is that the rate of impact absorption and the rate of return of the seat 14 to reference height are different from one another and, further, are maintained in an approximate ratio over an adjustment range. Accordingly, the diameter of the apertures and their vertical location in the wall 174 are preferably selected so that the second flow area is approximately one-third that of the first flow area for the range of adjustment positions of the plug 162.

Figure 1A:
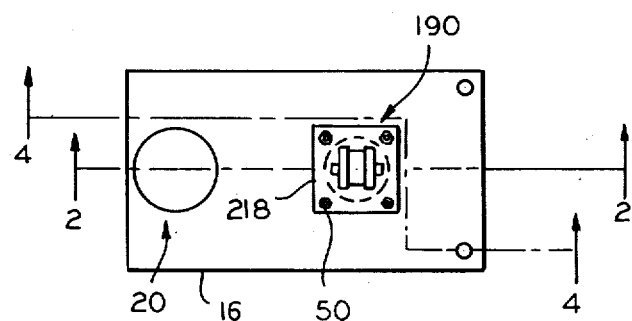
FIG. 1A is a top plan view of the seat suspension system of FIG. 1.

Referring to FIGS. 1, 1A and 2, the cylinder 18 is preferably of the tie-rod type and includes an elongate, hollow cylindrical sidewall 186 closed at its upper end 188 by a plug member 190 for receiving a piston assembly 192 in slidable engagement with the sidewall 186 and the plug member 190. The cylinder 18 also includes an adjustable valve member 80 which cooperates with a lower end 194 the piston assembly 192 for controllably metering fluid from the cylinder chamber 126 to provide selective adjustment of the seat reference height.

More particularly, the cylinder sidewall 186 includes a lower end 196 snugly received in the pocket side 44 for sidewall support and an upper end 188 for receiving the plug member 190 in closely fitted sealing engagement. The lower end 196 includes an annular shallow relief notch 198 formed to a depth in the wall outer periphery, thereby providing a support shoulder 200 for engaging the upper surface 24 of the block adjacent the pocket 42. Fluid tight sealing between the lower end 196 and the pocket side 44 by a resilient O-ring 202 disposed between a chamfer 204 formed at the lower extremity of the lower end 196 and the corner defined by the intersection of the pocket face 46 and the pocket side 44. At its lower, interior end 206, the plug 190 includes a generally horizontal bottom surface 208 and a cylindrical neck portion 210 of a diameter selected to engage the interior surface of the sidewall 186 with snug fit. A resilient O-ring 212 is received within an annular, circumferential groove 214 formed in the neck 210 for providing fluid tight sealing engagement between the plug 190 and the sidewall 186. At its upper, exterior end 216, the plug 190 includes a generally square clamping pad 218 having a planar top surface 220 and a vertical aperture 222 formed adjacent each corner thereof, each aperture 222 being adapted to receive a tie-rod 50 with slight clearance. The lower ends of the tie-rods 50 are threadably received in the holes 48 and have a length selected to extend slightly above the pad surface 220 to permit secure attachment with a locking nut 224 and washer 226. The lateral spacing of the opposing horizontal edges of the clamping pad 218 and the locations of the apertures 222 are selected so that when the tie-rods 50 are installed as shown in FIGS. 1 and 3, each tie-rod 50 is vertically aligned with its respective hold and is disposed exterior of the cylinder sidewall 186 with slight clearance. A vertically disposed, threaded leakage port 228 is formed between the bottom surface 208 and the top surface 220 intermediate a pair of adjacent tie-rod apertures 222 for providing a leakage path from the cylinder upper chamber 230 to the hydraulic tank.

The plug 190 also includes a vertically disposed, generally cylindrical coaxial bore 232 adapted for receiving a fluid seal 234 and a bearing sleeve 236 for slidably supporting a piston assembly tube member 238. The bore 232 has an annular, lower pocket 240 of enlarged diameter and formed to a depth in the surface 208 for snugly receiving the hollow, cylindrical bearing sleeve 236 having an inner diameter sized to permit closely-fitted sliding movement of a tube member 238 therethrough and is selected of a material having anti-friction qualities, such as, for example, bronze. The bearing sleeve 236 is retained in the pocket 240 by a snap ring 242 received in a suitable circumferential groove 244 formed in the wall of the pocket near its lower terminus.

The plug member 190 also includes an annular, upper pocket 246 disposed intermediate the first pocket 240 and the top surface 220 and adapted to receive and retain a lip-type wiper seal 248 for providing fluid sealing between the tube member 238 and the plug 190 and for preventing dirt from entering the chamber 230.

The piston assembly 192 includes an elongate, cylindrical, upwardly disposed tube member 238 and a lower, generally disc-shaped head 250 for coupling the seat 14 to the cylinder 18 and for providing motion dampening support thereof. The tube member 238 has a first end 252 which protrudes through the clamping pad 218 and has an apertured clevis 254 attached thereto for pivotably coupling the tube member 238 to the seat 14 and restraining the tube member 238 from rotating within the cylinder 18. The head 250 includes an upper face 256, a lower face 258 and a cylindrical outer surface 260 having a diameter adapted to closely, slidably engage the interior surface of the sidewall 186. An annular seal groove 262 of rectangular cross-section is circumferentially formed in the outer surface 260 intermediate the upper face 256 and lower face 258 for receiving an annular sealing ring 264 and resilient backup O-ring 266, thereby providing a sliding, substantially fluid tight seal between the upper chamber 230 and the lower chamber 126. The head also includes a shallow, cylindrical clearance relief area 268 formed upwardly to a depth in the lower face 258 to facilitate attachment of the tube member 238 to the head 250 as described below. A vertically disposed, coaxial center bore 270 extends between the upper face 256 and the relief area 268 and is sized to receive the tube member 238 with snug fit. Attachment of the tube member 238 to the head 250 is by an upper snap ring 272 and a lower snap ring 274 received within suitable snap ring grooves 276 and 278 respectively which are circumferentially formed in the exterior surface of the tube member 238. The spacing of the snap ring grooves 276 and 278 is such that the rings 272 and 274 snugly abut the upper face 256 and the relief area face 280 respectively when the tube member 238 is attached. The lower end of the tube member 238 protrudes downwardly below the head 250 and has a generally wedge-shaped lower terminus 282 formed by a planar cut which is angularly displaced from the longitudinal center line of the tube member 238 thereby defining an upwardly, outwardly sloping oval shaped edge 284 as seen in FIG. 2A. The edge 284 intersects and cooperates with a radial passage 286 in the valve member 80 to define a flow restricting orifice for controllably flowing fluid from the lower chamber 126 to the tank and thereby providing a load counterbalancing pressure within the chamber 126. To prevent damage to the protruding lower terminus 282 by possible impact with the face 46, an annular, cylindrical spacing ring 288 is snugly fitted within the lower end of the sidewall 186 and has its lower edge 290 in abutment with the pocket face 46. The ring 288 has a height selected to maintain slight clearance between the terminus 282 and the face 46 when the head 250 abuts the ring upper edge 292.

A vertically disposed, elongate, cylindrical valve member 80 has a lower end 294 threadably, rotatably received in the block lower portion 82 and a stepped upper body portion 296 sized to closely, slidably engage the intermediate and upper portions 84 and 86 of the bore 78. The valve member 80 includes a lower diametrical through passage 298 having a vertical location selected so that the passage 298 is in fluid communication with the tank cavity 88 when the valve member 80 is threadably coupled to the block 16. A coaxial, longitudinal passage 300 is formed between the passage 298 and the upper terminus 302 of the valve member for providing fluid communication between the valve member 80 and a tank. Intermediate the upper terminus 302 and the passage 298, the valve member 80 also includes a radial cross passage 286 for providing fluid communication between the longitudinal passage 300 and the cylinder lower chamber 126 generally defined by the pocket face 46, the sidewall 186 and the head lower surface 258. As seen in FIGS. 2 and 2A and since the valve member is rotatable through an arc of approximately 120° about its longitudinal axis, it is apparent that the cross passage 286 and the oval-shaped edge 284 will have a common point of intersection 303 for a range "R" of vertical positions of the head 250 and tube member 238 within the cylinder wall 186. Further, the dimension of range "R" will be substantially equal to the projected vertical length of the oval shaped edge 284 while the distance of the point of intersection 303 above the face 46 of the pocket 42 will be a function of the angular position of the cross passage 286 within the arc.

In order to limit the adjustable rotation of the valve member 80 through an arc of approximately 120° the valve member 80 is provided with a limit rod 301 normally attached to its lower end 294 and a pair of limit pins 305 snugly received in holes formed in the lower surface 26. The location of the limit pins 305 is selected so that when the limit rod 301 is in contact with one pin, the passage 286 may intersect the oval shaped edge 284 at its upper teminus as illustrated in FIG. 2A. The location of the other pin is selected so that the passage 286 may intersect the edge 284 near its lower terminus when the limit rod is in contact therewith.

Figure 6:
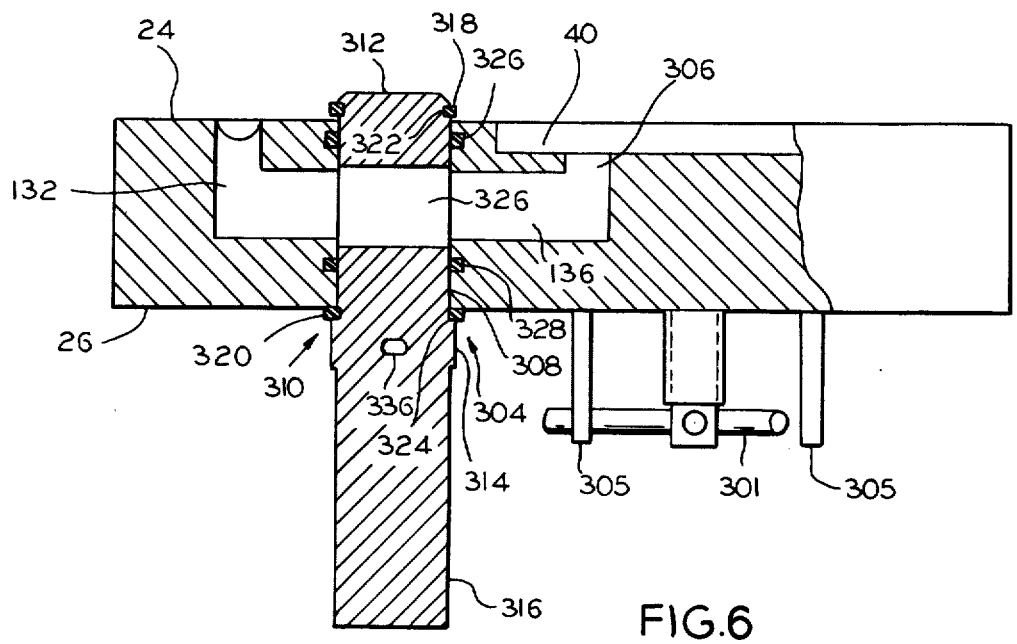
FIG. 6 is a sectional front elevation view of a second embodiment of the seat suspension system taken along the line 4—4 of FIG. 1A with portions broken away.
Figure 7:
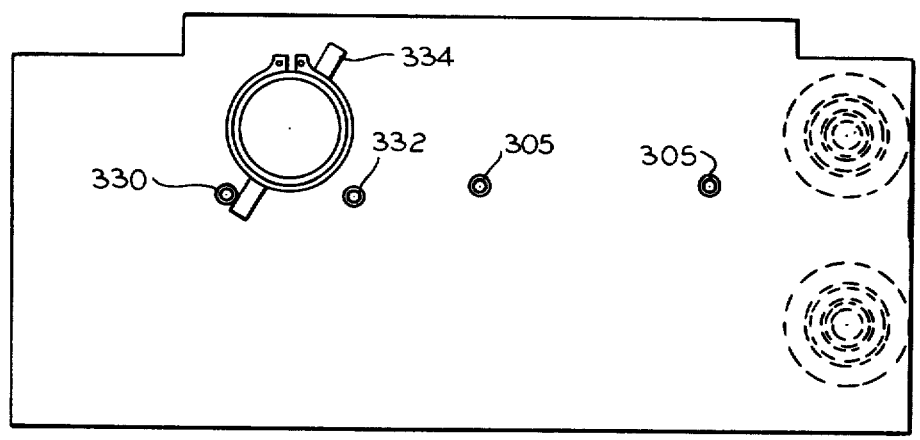
FIG. 7 is a bottom plan view of a second embodiment of the seat suspension system.

Referring to FIGS. 6 and 7, for reasons related to simplicity and resultant lower cost, it may be desirable to substitute an adjustable, flow restricting control valve 304 for the check valve assembly 140 so that the rates of fluid flow between the accumulator 20 and the cylinder 18 will be uniformly dampened, irrespective of the direction of flow. When constructed according to this second preferred embodiment, the check valve assembly 140 is omitted and a third leg 306 is substituted for the bore 138 and is formed in the pocket face 40 at a depth to intersect the second leg 136. Accordingly, FIG. 6 shows a valve assembly disposed through bore 308 formed between the upper surface 24 and the lower surface 26 intermediate the first leg 132 and the third leg 306 and generally parallel thereto. The location of the bore 308 is selected to intersect the second leg 136 and is sized to receive a generally cylindrical elongate flow control assembly 310 in rotatable, closely fitting engagement. The control assembly 310 has an upper end 312 which protrudes through the upper surface 24, a midsection 314 and a lower end 316 for valve adjustment. The control assembly 310 is retained in the bore 308 by a pair of snap rings 318 and 320 disposed, respectively, in a first snap ring groove 322 formed adjacent the upper end 312 and a second snap ring groove 324 formed in the midsection 314. The spacing of the snap ring grooves 322 and 324 is selected so that the snap rings 318 and 320 abut the upper surface 24 and the lower surface 26 respectively when the assembly 310 is installed. The assembly 310 includes a radial flow passage 326 therethrough having a diameter approximately equal to that of the second leg 136 and located to be coaxial therewith when the valve 304 is in its illustrated full open position. Fluid tight sealing between the assembly 310 and the bore 308 is by a pair of resilient O-rings 326 and 328 disposed in suitable grooves circumferentially formed in the bore interior and outwardly spaced apart from the second leg 136. In order to limit the arc through which the assembly 310 may be rotated to provide adjustable flow control, the valve 304 also includes a first stop pin 330 and a second stop pin 332 spaced apart therefrom and received in vertical holes formed in the lower surface 26 adjacent the bore. A diametrically disposed stop rod 334 for engaging the pins 330 and 332 is tightly received in a stop rod hole 336 formed in the assembly 310. The location of the first stop pin 330 is selected such that when the stop rod 334 is in contact therewith, the second leg 136 and the passage 326 are in a first, coaxially aligned position as illustrated. It is apparent that rotation of the assembly 310 to a position 90° from the first aligned position would cause the longitudinal axis of the passage 326 to be normal to the longitudinal axis of the second leg 136, thereby entirely blocking the accumulator duct 76. From a performance standpoint, such blockage is undesirable. Therefore, the location of the second stop pin 332 is selected such that when the stop rod 334 is in contact therewith, the restricted flow area resulting from the partial intersection of the second leg 136 and the passage 326 is selected to provide that degree of bidirectional flow dampening which results in the lowest desired system response rate.

In operation and with the clevis 254 coupled to the seat 14 and the block 16 pivotably supported upon the vehicle chassis 12 by trunnions 40, a hydraulic pump is connected to the block pressure port 106 for providing a source of pressurized fluid and the tank port 90 and leakage port 228 are connected to an externally mounted hydraulic tank. With the operator seated, fluid under pressure is introduced into the lower cylinder chamber 126 through the pressure port 106, whereupon the seat 14 and operator are raised to a reference height which is selected by operator manipulation of the position of the valve member 80 within an arc. As the seat 14 reaches the point at which the radial cross-passage 286 intersects with and partially overlaps the oval-shaped edge 284, fluid is permitted to be controllably bled from the lower chamber 126 to tank. The degree of overlap and therefore the area of orifice 303 will be that required to provide a pressure within the lower chamber 126 so that the resulting upward force against the lower surface 258 of the head 250 precisely counterbalances the combind weight of the seat 14 and the operator. When the vehicle encounters a rise in the terrain, the chassis 12 will be urged upward with respect to the position of the seat 14 causing the head 250 and the tube member 238 to be downwardly retracted within the cylinder sidewall 186. The oval-shaped edge 284 will therefore be caused to fully overlap the radial passage 286, effecting complete closure thereof, and the fluid otherwise trapped in the lower chamber 126 is expelled through the first flow area 178 of the check valve assembly 140 and the accumulator duct 76 in a first flow direction to the fluid receiving accumulator 20 for resilient impact absorption. Upon expulsion of the initial quantity of fluid from the lower chamber 126, the force resulting from the pressure differential across the check member 144 causes it to move downwardly against the urging of the resilient spring 150 until its lower end is in contact with the bottom 172 of the hole 168 formed in the upper end of the plug member 142. Fluid thereupon flows through the annular first flow area defined by the space between the lip 146 and the flange 176. The rate at which fluid is permitted to flow in a first direction through the check valve assembly 140 is governed by the adjusted position of the plug member 142 and therefore by the cross-sectional area of the first flow area. After the encountered rise recedes and since the pressure of the fluid within the accumulator 20 is then greater than the pressure of the fluid entering at the pressure port, the fluid flows in a second flow direction through the accumulator duct 76 and the check valve assembly 140 to the cylinder lower chamber 126. The pressure differential across the check member 144 caused by fluid flowing in a second direction results in a force upon the check member 144 which is additive to the force caused by the resilient spring 150. The check member 144 therefore moves upwardly until its flange 176 abuts the retaining lip 146. With the check member so positioned, the second flow area defined by the combined exposed upper segments 182 of the apertures 180 controllably restricts the rate of flow of fluid from the accumulator 20 to the lower chamber 126 to return the head 250, tube member 238 and attached seat 14 to the pre-selected reference height. Further, the rate of flow in a first dierection is approximately three times the rate of flow in a second direction with the ratio of flow rates being held substantially constant over the adjustment range of the plug member 142.

Conversely, if the vehicle should encounter a depression in the terrain whereby the chassis 12 is permitted to move downward with respect to the position of the seat 14, the oval-shaped edge 284 will underlap and fully open the cross-passage 286 and fluid will be permitted to flow at a relatively rapid rate from the lower chamber 126 to the tank, thereby permitting the seat 14 to return to its reference height. Any leakage fluid which escapes from the lower chamber past the seal ring 264 and into the upper chamber 230 is permitted to drain to tank through the leakage port 228 formed in the plug 190. By adjusting the setting of the plug member 142, the operator may tailor the relative resilience of the system to his own preferences without disturbing the predetermined ratio of rates at which the system absorbs impact and returns the seat 14 to a reference height.

In the alternative and with respect to a second embodiment, the operator may adjust the flow control valve 304 for preferred system resilience while maintaining rates of impact absorption and of system return to a reference height which are substantially identical irrespective of the direction of fluid flow.

While only a few embodiments of the invention have been illustrated and described, it is not intended to be limited thereby but only by the scope of the appended claims.

We claim:

1. A system for resiliently supporting a load at a reference height comprising:
cylinder means for resiliently supporting a load about a reference height;
accumulator means defining a flow path between said cylinder means and said accumulator means whereby hydraulic fluid may flow therebetween in response to varying loads imposed on said cylinder means;

adjustable flow restricting valve means disposed in said flow path for dampening the rate of said fluid flow;

said flow restricting means including check means disposed in said flow path and movable therein between a first position and a second position, said check means defining a first flow area for dampening the flow of fluid through said flow path in a first direction when said check means is in said first position, said check means also defining a second flow area for dampening the flow of fluid through said flow path means in a second direction when said check means is in said second position, the ratio of said first flow area to said second flow area having a predetermined value, said flow restricting means includes adjustment means for varying said first flow area and said second flow area while maintaining approximately said predetermind value, and adjustable metering valve means coacting with said cylinder means for selecting the reference height about which said load is supported.

2. The invention set forth in claim 1 wherein said first flow area is substantially larger than said second flow area.

3. A system for resiliently supporting a load at a reference height comprising:

cylinder means for resiliently supporting a load about a reference height;

accumultor means defining a flow path between said cylinder means and said accumulator means whereby hydraulic fluid may flow therebetween in response to varying loads imposed on said cylinder means;

adjustable flow restricting valve means disposed in said flow path for dampening the rate of said fluid flow;

adjustable metering valve means coacting with said cylinder means for selecting the reference height about which said load is supported, said adjustable metering valve means includes tubular means and a passage adjustable to a position with respect to said tubular means, said tubular means and said passage cooperating to define pressure-regulating orifice means for counterbalancing said supported load.

4. The invention set forth in claim 3 wherein said orifice means controllably allows fluid to flow from said cylinder means to a tank when said load is counterbalanced.

5. The invention set forth in claim 4 wherein said cylinder means includes an interior, generally horizontal face, said tubular means includes a generally oval-shaped lower edge angularly disposed with respect to said face and said passage is movable to intersect loci along said edge whereby said reference height is adjustable over a range.

6. A system for resiliently supporting a seat upon a vehicle chassis at an adjustable height, said system comprising:

resilient cylinder means coupled between a chassis and a seat to be supported;

accumulator means coupled to said cylinder means for receiving pressurized fluid flowing from said cylinder means in a first direction and flowing said fluid to said cylinder means in a second direction;

flow restricting valve means connected between said cylinder means and said accumulator means for adjustably dampening the rates of said fluid flows;

adjustable metering valve means disposed interiorly of said cylinder means and coacting therewith for selecting a reference height about which said seat is supported, said metering valve means including valve member means having a fluid flow passage and a tubular member slidably coupled to said valve member means, said valve member means and said tubular member being constructed and arranged to define passage orifice means for controllably allowing fluid to flow from said cylinder means when said seat is at said reference height, said passage and said tubular member being constructed and arranged to intersect at points varyingly spaced apart from a reference surface for determining said reference height about which said seat is supported.

7. The invention set forth in claim 6 wherein said tubular member includes an edge angularly disposed with respect to said reference surface and having a point therealong intersecting said passage for any reference height about which said seat may be supported within a range of reference heights.

8. The invention set forth in claim 7 wherein said edge is generally oval-shaped and defines the lower terminus of said tubular member and said valve member means is adjustable to position said passage with respect to said edge whereby the spacing of said point of intersection from said reference surface may be varied by adjustment of the position of said valve member means.

9. A system for resiliently supporting a seat upon a vehicle chassis at an adjustable height, said system comprising:

resilient cylinder means coupled between a chassis and a seat to be supported;

accumulator means coupled to said cylinder means for receiving pressurized fluid flowing from said cylinder means in a first direction and flowing said fluid to said cylinder means in a second direction;

flow restricting valve means connected between said cylinder means and said accumulator means for adjustably dampening the rates of said fluid flows;

adjustable metering valve means disposed interiorly of said cylinder means and coacting therewith for selecting a reference height about which said seat is supported, said flow restricting valve means being disposed in a flow path connecting said accumulator means and said cylinder means and includes check means slidably received in plug member means and movable between a first position and a second position with respect to said plug member means, said check means and said plug member means being constructed and arranged to define a second flow area for dampening the rate of fluid flow in said second direction when said check means is in said second position.

10. The invention set forth in claim 9 wherein said flow restricting valve means further includes lip means, said check means being spaced apart from said lip means in said first position to define a first flow area for dampening the rate of fluid flow in said first direction.

11. The invention set forth in claim 10 wherein the ratio of said first flow area to said second flow area is maintained to an approximate predetermined value over the adjustment range of said first valve means.

12. The invention set forth in claim 11 wherein said first flow area is greater than said second flow area.

13. The invention set forth in claim 12 wherein said predetermined value is about 3:1.

14. A system for resiliently supporting a seat upon a vehicle chassis at an adjustable height, said system comprising:
   resilient cylinder means coupled between a chassis and a seat to be supported;
   accumultor means coupled to said cylinder means for receiving pressurized fluid flowing from said cylinder means in a first direction and flowing said fluid to said cylinder means in a second direction;
   flow restricting valve means connected between said cylinder means and said accumulator means for adjustably dampening the rates of said fluid flows;
   adjustable metering valve means disposed interiorly of said cylinder means and coacting therewith for selecting a reference height about which said seat is supported,
   said flow restricting valve means including flow control means having passage means therethrough for adjustably, controllably dampening the flow of fluid between said cylinder means and said accumulator means.

15. A hydraulic system for resiliently supporting an operator's seat upon the chassis of a vehicle comprising
   cylinder means including piston assembly means and body means telescopingly coupled between a vehicle chassis and a seat to be supported;
   accumulator means coupled to said cylinder means for flowing hydraulic fluid therebetween in response to varying loads imposed on said seat;
   block means supporting said cylinder means and said accumultor means and having a duct formed therein and interconnecting said accumulator means and said cylinder means;
   first valve means disposed in said duct for adjustably dampening the rate of fluid flowing therethrough;
   second valve means disposed intriorly of said cylinder means for adjustably selecting the reference height about which said seat is supported,
   said piston assembly means, said body means and said block means cooperating to define chamber means of variable volume for confining a fluid under pressure;
   said piston assembly including elongate tubular means having its upper terminus coupled to said seat and its lower edge within said chamber means, said second valve means includes valve member means within said chamber means, said edge and said valve member means being constructed and arranged for adjustably selecting said reference height about which said seat is supported.

16. The invention set forth in claim 15 wherein said first valve means includes lip means, check means and plug means, said check means cooperating with said lip means to define a first flow area for dampening the rate of fluid flowing therethrough in a first direction, said check means cooperating with said plug means to define a second flow area for dampening the rate of fluid flowing therethrough in a second direction.

17. The invention set forth in claim 16 wherein the ratio of said first flow area to said second flow area is maintained to an approximate predetermined value over a range of adjustment of said plug means.

18. The invention set forth in claim 15 wherein said first valve means includes flow restricting valve means providing an adjustably variable flow area for uniformly dampening the rate of fluid flowing therethrough in a first direction or a second direction.

* * * * *